United States Patent
Wang et al.

(10) Patent No.: US 9,010,971 B2
(45) Date of Patent: Apr. 21, 2015

(54) PHOSPHOR WHEEL HEAT-DISSIPATING MODULE FOR LASER PROJECTION SYSTEM

(71) Applicant: Delta Electronics, Inc., Taoyuan Hsien (TW)

(72) Inventors: Hui-Hsiung Wang, Taoyuan Hsien (TW); Yu-Hsuan Sha, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 14/074,461

(22) Filed: Nov. 7, 2013

(65) Prior Publication Data

US 2015/0009685 A1   Jan. 8, 2015

(30) Foreign Application Priority Data

Jul. 3, 2013   (TW) .............................. 102123800 A

(51) Int. Cl.
*G03B 21/16*   (2006.01)
(52) U.S. Cl.
CPC ..................................... *G03B 21/16* (2013.01)
(58) Field of Classification Search
CPC ...... G03B 21/204; G03B 21/16; G03B 21/14; F21V 29/02; F21Y 2101/025; G02B 26/008; H04N 9/3144; H04N 9/3161; F21K 9/56; F21S 10/007; F21S 10/02
See application file for complete search history.

(56) References Cited

U.S. PATENT DOCUMENTS

2013/0169938 A1\*   7/2013   Huang et al. .................... 353/31

\* cited by examiner

*Primary Examiner* — Donald Raleigh
(74) *Attorney, Agent, or Firm* — Kirton McConkie; Evan R. Witt

(57) ABSTRACT

A phosphor wheel heat-dissipating module for a laser projection system is provided. The phosphor wheel heat-dissipating module includes a phosphor wheel, a plurality of air vents and an impeller. At least one phosphor agent is coated on an outer-ring portion of a first surface of the phosphor wheel. The air vents run through the phosphor wheel. The impeller is disposed on a second surface of the phosphor wheel, and includes an inlet and a first outlet. A laser beam is projected on the outer-ring portion of the phosphor wheel. When the phosphor wheel is rotated at a high rotating speed, an airflow is inhaled into the impeller through the inlet. A first portion of the airflow is blown out through the first outlet, and a second portion of the airflow is transferred to the first surface of the phosphor wheel through the air vents.

5 Claims, 4 Drawing Sheets

PHOSPHOR WHEEL HEAT-DISSIPATING MODULE FOR LASER PROJECTION SYSTEM

FIELD OF THE INVENTION

The present invention relates to a heat-dissipating module, and more particularly to a phosphor wheel heat-dissipating module for effectively reducing the temperature of a phosphor wheel of a laser projection system.

BACKGROUND OF THE INVENTION

In the current laser projection system, a laser light source is used to emit a laser beam to excite a phosphor agent in order to generate color lights with different wavelengths. Since the laser beam has high energy and high collimation, the temperature of the laser beam is extremely high (e.g. the temperature may be close to or higher than 1000° C.), and the phosphor agent is readily burnt out. Nowadays, the phosphor agent is coated on an outer-ring portion of a phosphor wheel (also referred as color wheel), and the phosphor wheel is driven by a motor to be rotated at a high speed. Consequently, the energy absorbed by the phosphor agent per unit time is reduced, and the heat-dissipating efficacy is achieved. However, with the increasing demands on the luminance of optical products, the required energy of the laser light sources are gradually increased. For meeting the luminance requirements, the area of the phosphor wheel is gradually increased. Under this circumstance, the optical path of illuminating the phosphor agent is increased, and the energy absorbed by the phosphor agent per unit time is increased.

However, the increased area of the phosphor wheel may bring some problems. For example, since the size of the phosphor wheel is increased, the system space of the laser projection system is correspondingly increased. In other words, the overall volume of the laser projection system is increased. Moreover, after the size of the phosphor wheel is increased, the high speed motor should be upgraded to maintain its high speed. Since the area of the phosphor wheel is increased, it is difficult to maintain the balance of the phosphor wheel. As known, there are few commercially-available motors that match the large-sized phosphor wheel. Even if the motor matching the large-sized phosphor wheel is acquired, associated accessories of the motor should be developed. Moreover, as the speed of the motor is increased, the problem of causing noise is increased. Due to the limitations of the size of the phosphor wheel and the corresponding requirement of the motor, the high energy laser light source is not suitably used in the conventional laser projection system. In other words, if the area of the phosphor wheel and the rotating speed of the motor fail to be increased, the luminance of the laser projection system is restricted.

Moreover, even if the rotating speed of the motor for rotating the phosphor wheel is increased, since the phosphor wheel has a circular disc profile, another problem occurs. For example, it is difficult to cause a pressure difference of the ambient air during rotation of the phosphor wheel. Since the airflow cannot be effectively driven, the heat-dissipating efficacy is usually unsatisfied.

Therefore, there is a need of providing a phosphor wheel heat-dissipating module for effectively removing heat from a phosphor wheel of a laser projection system without increasing the area of the phosphor wheel.

SUMMARY OF THE INVENTION

The present invention provides a phosphor wheel heat-dissipating module for effectively removing heat from a phosphor wheel of a laser projection system without increasing the area of the phosphor wheel.

The present invention also provides a phosphor wheel heat-dissipating module for a laser projection system. By using the inventive phosphor wheel heat-dissipating module for a laser projection system, the heat-dissipating efficiency is enhanced, the local temperature of the outer-ring portion of the phosphor wheel is reduced to uniform the distribution of the temperature of the phosphor wheel, and the overall volume of the laser projection system is decreased. Moreover, since the heat-dissipating efficiency of the phosphor wheel is enhanced, the phosphor wheel can withstand higher energy of the laser beam without the need of increasing the area thereof and the luminance of the laser projection system can be enhanced.

In accordance with an aspect of the present invention, there is provided a phosphor wheel heat-dissipating module for a laser projection system. The phosphor wheel heat-dissipating module comprises a phosphor wheel, a plurality of air vents and an impeller. The phosphor wheel has a first surface and a second surface opposed to the first surface. At least one phosphor agent is coated on an outer-ring portion of the first surface of the phosphor wheel. The air vents run through the first surface and the second surface of the phosphor wheel. The impeller is disposed on the second surface of the phosphor wheel, and includes an inlet and a first outlet. A laser beam emitted by the laser projection system is projected on the outer-ring portion of the first surface of the phosphor wheel at a specific region. When the phosphor wheel is rotated at a high rotating speed, an airflow is inhaled into the impeller through the inlet. A first portion of the airflow is blown out through the first outlet, and a second portion of the airflow is transferred to the first surface of the phosphor wheel through the air vents, thereby removing heat from the phosphor wheel.

In accordance with another aspect of the present invention, there is provided a phosphor wheel heat-dissipating module for a laser projection system. The phosphor wheel heat-dissipating module comprises a phosphor wheel, a plurality of air vents, an impeller and an airflow guiding device. The phosphor wheel has a first surface and a second surface opposed to the first surface. At least one phosphor agent is coated on an outer-ring portion of the first surface of the phosphor wheel. The air vents run through the first surface and the second surface of the phosphor wheel. The impeller is disposed on the second surface of the phosphor wheel, and includes an inlet and a first outlet. The airflow guiding device faces the first surface of the phosphor wheel, and includes at least one second outlet. A laser beam emitted by the laser projection system is projected on the outer-ring portion of the first surface of the phosphor wheel. When the phosphor wheel is rotated at a high rotating speed, an airflow is inhaled into the impeller through the inlet. A first portion of the airflow is blown out through the first outlet, and a second portion of the airflow is transferred to the first surface of the phosphor wheel through the air vents. The second portion of the airflow is guided by the airflow guiding device to remove heat from the first surface and the outer-ring portion of the phosphor wheel, and then the second portion of the airflow is blown out through the at least one second outlet.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
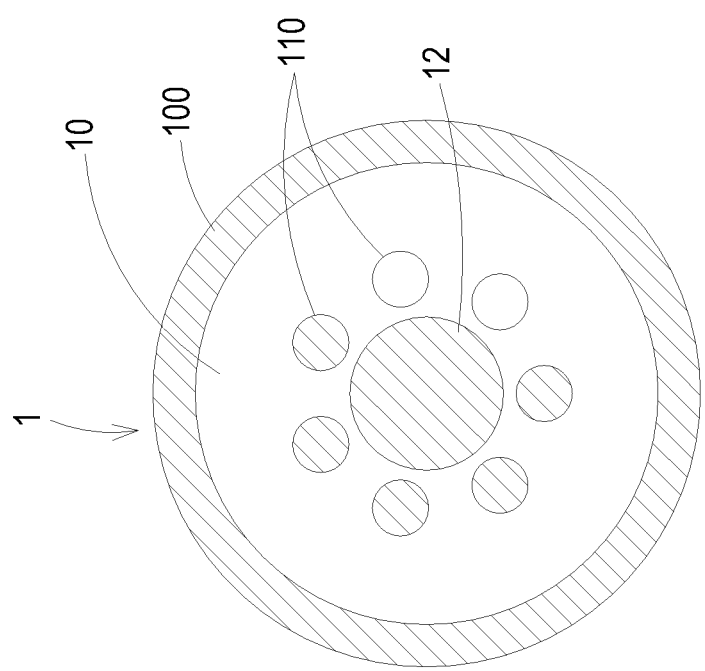
FIG. 1A is a schematic side view illustrating a first surface of a phosphor wheel of a phosphor wheel heat-dissipating module according to a first embodiment of the present invention.
Figure 1B:
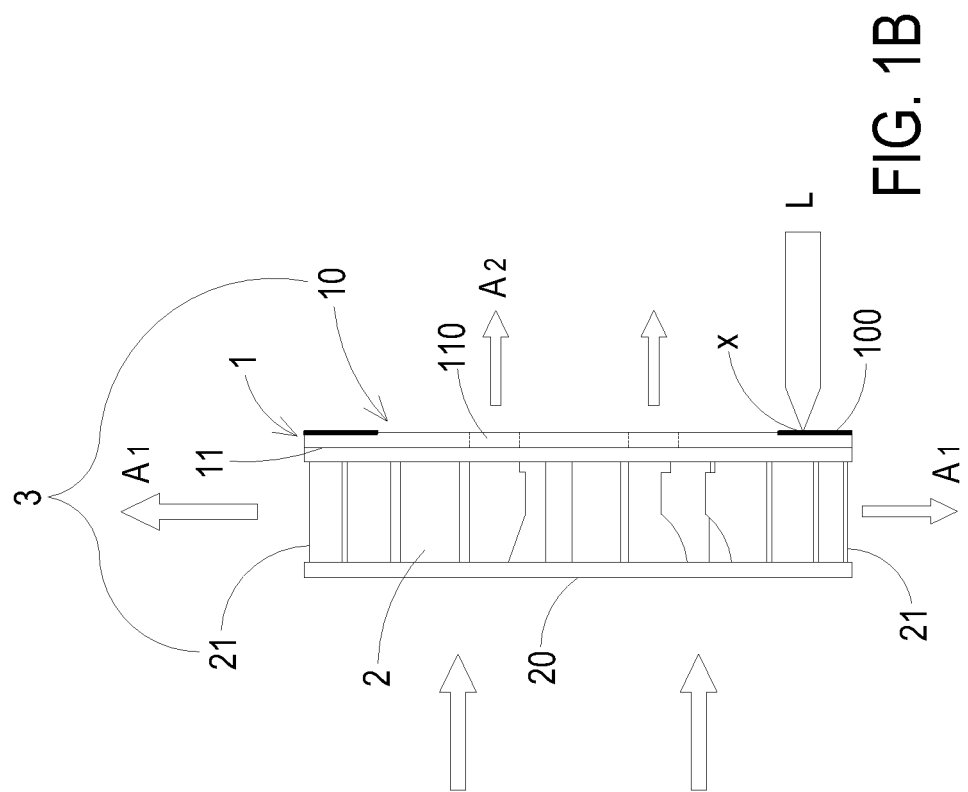
FIG. 1B is a schematic side view illustrating the phosphor wheel heat-dissipating module according to the first embodiment of the present invention.

FIG. 1A is a schematic side view illustrating a first surface of a phosphor wheel of a phosphor wheel heat-dissipating module according to a first embodiment of the present invention. FIG. 1B is a schematic side view illustrating the phosphor wheel heat-dissipating module according to the first embodiment of the present invention. Please refer to FIGS. 1A and 1B. The phosphor wheel heat-dissipating module 3 is used in a laser projection system (not shown). The phosphor wheel heat-dissipating module 3 comprises a phosphor wheel 1, a plurality of air vents 110 and an impeller 2. In this embodiment, the phosphor wheel 1 has a circular disc structure, and is made of a metallic material. It is noted that the structure and the material of the phosphor wheel 1 are not restricted. Moreover, the phosphor wheel 1 has a first surface 10 and a second surface 11. The first surface 10 and the second surface 11 are opposed to each other. The phosphor wheel 1 has a rotating shaft 12 protruded from the first surface 10. The rotating shaft 12 is connected with a motor (not shown). When the rotating shaft 12 is driven by the motor, the phosphor wheel 1 is correspondingly rotated with the rotating shaft 12 at a high rotating speed. In addition, at least one phosphor agent (not shown) is coated on an outer-ring portion 100 of the first surface 10. A laser beam L is projected on the outer-ring portion 100 of the first surface 10 to excite the phosphor agent.

Please refer to FIG. 1A again. The plural air vents 110 are formed in the phosphor wheel 1. The plural air vents 110 run through the first surface 10 and the second surface 11 of the phosphor wheel 1. In this embodiment, the plural air vents 110 are circular openings. It is noted that the shapes of the air vents 110 are not restricted. For example, in some other embodiments, the plural air vents 110 are water-drop-shaped openings or triangular openings. Moreover, in this embodiment, the plural air vents 110 are arranged around the rotating shaft 12 along a circular trajectory. Certainly, the arrangement and the number of the plural air vents 110 may be varied according to the practical requirements. That is, as long as the air vents run through the first surface 10 and the second surface 11 of the phosphor wheel 1 for guiding the airflow to flow in the direction from the second surface 11 to the first surface 10, the arrangement and the number of the plural air vents 110 are not restricted.

Figure 1C:
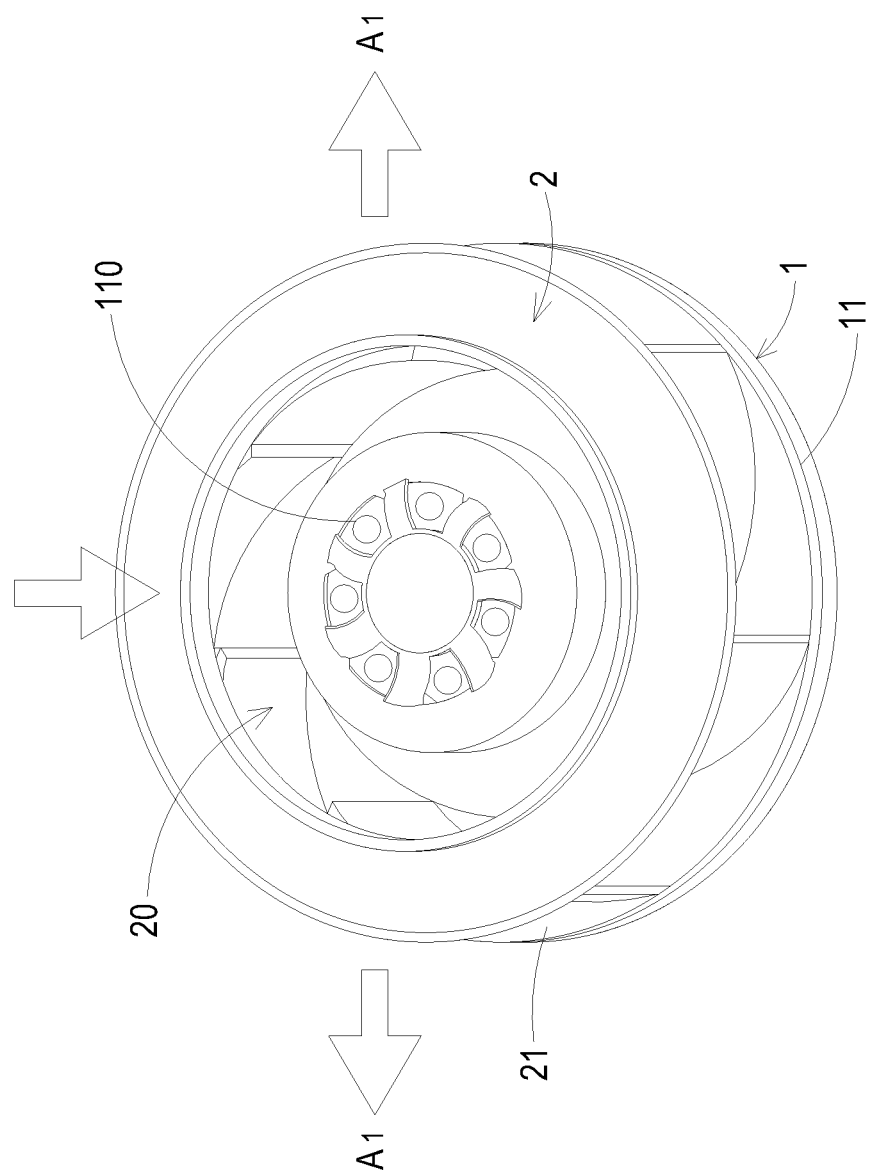
FIG. 1C is a schematic perspective view illustrating an impeller and a second surface of the phosphor wheel according to the first embodiment of the present invention.

FIG. 1C is a schematic perspective view illustrating an impeller and a second surface of the phosphor wheel according to the first embodiment of the present invention. Please refer to FIGS. 1B and 1C. The impeller 2 is disposed on the second surface 11 of the phosphor wheel 1. In this embodiment, the impeller 2 is a centrifugal impeller. Alternatively, in some other embodiments, the impeller 2 is an axial-flow impeller. The impeller 2 is fixed on the second surface 11 of the phosphor wheel 1 by locking, attaching, fastening or any other connecting means. As shown in FIG. 1C, the impeller 2 (e.g. the centrifugal impeller) is attached on the second surface 11 of the phosphor wheel 1. The impeller 2 has an inlet 20 and a first outlet 21. The inlet 20 is located at a center of the impeller 2 for inhaling airflow. The first outlet 21 is located at a lateral side of the impeller 2. When the phosphor wheel 1 is driven by the motor to be rotated at a high rotating speed, the impeller 2 fixed on the second surface 11 of the phosphor wheel 1 is correspondingly rotated. Consequently, the airflow is introduced into the impeller 2 through the inlet 20. Then, a first portion of the airflow ($A_1$), also referred as a lateral airflow, is blown out through the lateral side of the impeller 2. Due to the impeller 2, the heat transfer area of the phosphor wheel 1 is increased. Consequently, the heat from the second surface 11 of the phosphor wheel 1 can be effectively dissipated away.

Please refer to FIG. 1B again. When the laser beam L from the laser projection system is projected on a specified region X of the outer-ring portion 100 of the phosphor wheel 1, the phosphor agent contained in the outer-ring portion 100 of the phosphor wheel 1 is excited. Consequently, a color light with a specified wavelength is generated. When the phosphor wheel 1 is rotated, the airflow is inhaled into the impeller 2 through the inlet 20, and the lateral airflow $A_1$ is blown out through the lateral side of the impeller 2. Since the phosphor wheel 1 is made of the metallic material (e.g. an aluminum material), the lateral airflow $A_1$ can remove heat from the phosphor wheel 1 by convection. Moreover, a second portion of the airflow ($A_2$) is transferred to the first surface 10 of the phosphor wheel 1 through the plural air vents 110. Consequently, the heat from the outer-ring portion 100 of the first surface 10 can be effectively dissipated away.

Figure 2:
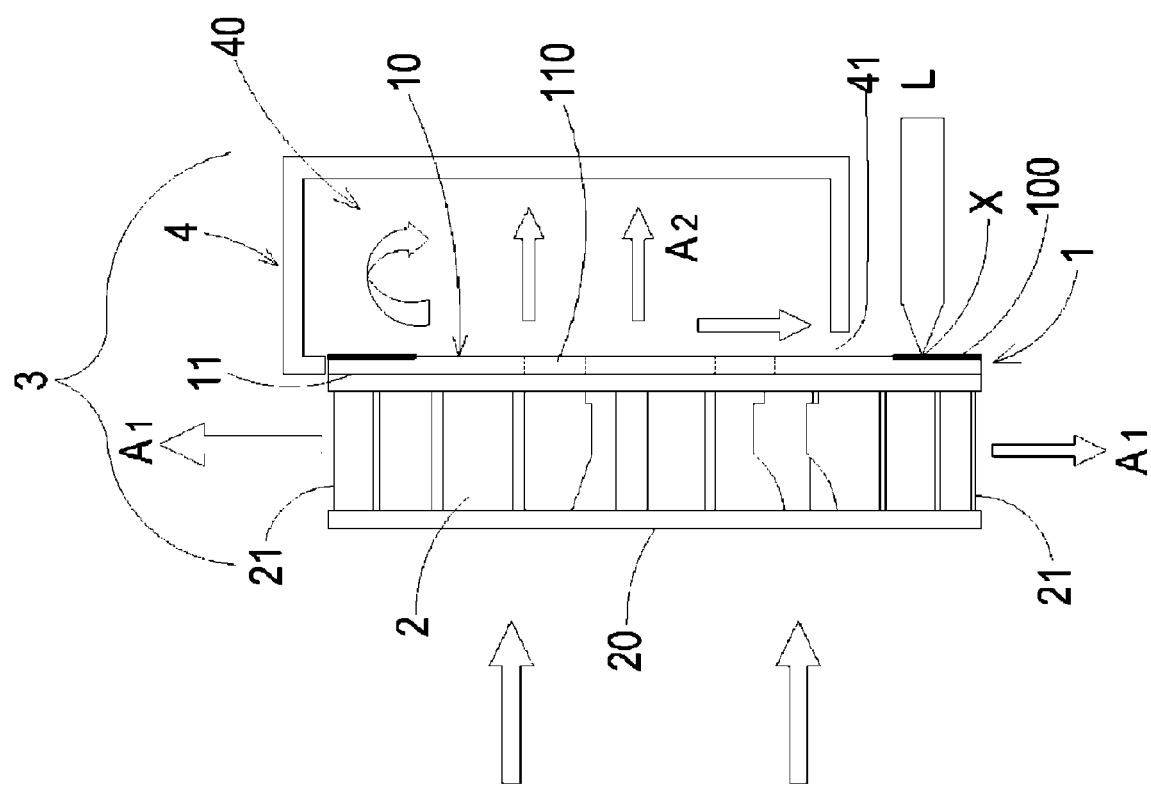
FIG. 2 is a schematic side view illustrating a phosphor wheel heat-dissipating module according to a second embodiment of the present invention.

FIG. 2 is a schematic side view illustrating a phosphor wheel heat-dissipating module according to a second embodiment of the present invention. The phosphor wheel heat-dissipating module 3 is used in a laser projection system (not shown). The phosphor wheel heat-dissipating module 3 comprises a phosphor wheel 1, a plurality of air vents 110, an impeller 2, and an airflow guiding device 4. The phosphor wheel 1 has a first surface 10 and a second surface 11. The first surface 10 and the second surface 11 are opposed to each other. The impeller 2 is disposed on the second surface 11 of the phosphor wheel 1. In addition, at least one phosphor agent (not shown) is coated on an outer-ring portion 100 of the first surface 10. A laser beam L is projected on the outer-ring portion 100 of the first surface 10 to excite the phosphor agent. The airflow guiding device 4 faces the first surface 10 of the phosphor wheel 1. Except that the phosphor wheel heat-dissipating module of this embodiment further comprises the airflow guiding device 4, the materials and structures of the other components of the phosphor wheel heat-dissipating module of this embodiment are substantially identical to those of the first embodiment, and are not redundantly described herein. Preferably, the airflow guiding device 4 is an airflow guiding cover. The first surface 10 of the phosphor wheel 1 is partially sheltered by the airflow guiding device 4, but at least portion of the outer-ring portion 100 of the phosphor wheel 1 is not sheltered by the airflow guiding device 4. Consequently, the laser beam L can be still projected on the outer-ring portion 100 of the phosphor wheel 1 at a specific region X. The airflow guiding device 4 can be fixed on a supporting member (not shown) in the laser projection system or fixed on the first surface 11 of the phosphor wheel 1 by locking, attaching, fastening or any other connecting means according to the practical requirements. The airflow guiding device 4 may be made of a plastic material, a metallic material or any other appropriate material.

Please refer to FIG. 2 again. The airflow guiding device 4 has an accommodation space 40 for accommodating the second portion of the airflow ($A_2$). The airflow guiding device 4 further comprises at least one second outlet 41. The second outlet 41 is arranged between the airflow guiding device 4 and the first surface 10 of the phosphor wheel 1. The second portion of the airflow ($A_2$) is blown out through the second outlet 41. When the laser beam L from the laser projection system is projected on the specified region X of the outer-ring portion 100 of the phosphor wheel 1, a great amount of heat is accumulated on the phosphor wheel 1. In addition, when the phosphor wheel 1 is rotated at the high rotating speed, the impeller 2 on the second surface 11 of the phosphor wheel 1 is correspondingly rotated. As the impeller 2 is rotated, the airflow is introduced into the impeller 2 through the inlet 20, and the lateral airflow $A_1$ is blown out through the lateral side of the impeller 2. Due to the impeller 2, the heat transfer area of the phosphor wheel 1 is increased. Consequently, the heat from the second surface 11 of the phosphor wheel 1 can be effectively dissipated away. Moreover, the second portion of the airflow ($A_2$) is transferred to the first surface 10 of the phosphor wheel 1 through the plural air vents 110. The second portion of the airflow ($A_2$) is guided by the airflow guiding device 4 and circulated within the accommodation space 40 of the airflow guiding device 4. Afterwards, the second portion of the airflow ($A_2$) is blown out through the second outlet 41. Consequently, the heat from the outer-ring portion 100 of the first surface 10 can be quickly dissipated away by the second portion of the airflow ($A_2$). The second portion of the airflow ($A_2$) blown out through the second outlet 41 is guided to remove heat from the specific region X. Moreover, since the phosphor wheel 1 is rotated at the high rotating speed, the flow rate of the airflow is correspondingly increased, and the heat-dissipating efficiency is enhanced. Moreover, since the local temperature of the outer-ring portion 100 of the phosphor wheel 1 is reduced by the phosphor wheel heat-dissipating module 3, the distribution of the temperature is more uniform. Under this circumstance, even if the energy of the laser beam L is increased, it is not necessary to increase the cross section area of the phosphor wheel 1. In other words, if the energy of the laser beam is not too high, the size of the phosphor wheel 1 may be reduced by using the phosphor wheel heat-dissipating module 3, and thus the overall volume of the laser projection system may be decreased. Moreover, since the heat-dissipating efficiency of the phosphor wheel 1 is enhanced, the phosphor wheel 1 can withstand higher energy of the laser beam L when compared with the conventional phosphor wheel. Under this circumstance, the overall brightness is enhanced.

From the above descriptions, the present invention provides a phosphor wheel heat-dissipating module for a laser projection system. The phosphor wheel heat-dissipating module comprises a phosphor wheel, a plurality of air vents and an impeller. The phosphor wheel has a first surface and a second surface. The impeller is disposed on the second surface of the phosphor wheel. The phosphor wheel heat-dissipating module further comprises an airflow guiding device. The airflow guiding device faces the first surface of the phosphor wheel. When the phosphor wheel is rotated at a high rotating speed, the impeller is correspondingly rotated. As the impeller is rotated, the airflow is introduced into the impeller through an inlet, and a first portion of the airflow is blown out through the lateral side of the impeller. A second portion of the airflow is transferred to the first surface of the phosphor wheel through the plural air vents. The second portion of the airflow is guided by the airflow guiding device and blown out through a second outlet. Consequently, the heat from an outer-ring portion of the phosphor wheel can be quickly dissipated away by the second portion of the airflow. Moreover, since the phosphor wheel is rotated at the high rotating speed, the flow rate of the airflow is correspondingly increased, and the heat-dissipating efficiency is enhanced. Moreover, since the local temperature of the outer-ring portion of the phosphor wheel is reduced by the phosphor wheel heat-dissipating module, the distribution of the temperature is more uniform. Moreover, since the heat-dissipating efficiency of the phosphor wheel is enhanced, the phosphor wheel can withstand higher energy of the laser beam without the need of increasing the area thereof. Moreover, the overall volume of the laser projection system may be decreased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A phosphor wheel heat-dissipating module for a laser projection system, said phosphor wheel heat-dissipating module comprising:
   a phosphor wheel having a first surface and a second surface opposed to said first surface, wherein at least one phosphor agent is coated on an outer-ring portion of said first surface of said phosphor wheel;
   a plurality of air vents running through said first surface and said second surface of said phosphor wheel;
   an impeller disposed on said second surface of said phosphor wheel, and comprising an inlet and a first outlet; and
   an airflow guiding device facing said first surface of said phosphor wheel, and comprising at least one second outlet,
   wherein a laser beam emitted by said laser projection system is projected on said outer-ring portion of said first surface of said phosphor wheel, wherein when said phosphor wheel is rotated at a high rotating speed, an airflow is inhaled into said impeller through said inlet, wherein a first portion of said airflow is blown out through said first outlet, and a second portion of said airflow is transferred to said first surface of said phosphor wheel through said air vents, wherein said second portion of said airflow is guided by said airflow guiding device to remove heat from said first surface and said outer-ring portion of said phosphor wheel, and then said second portion of said airflow is blown out through said at least one second outlet.

2. The phosphor wheel heat-dissipating module according to claim 1, wherein said phosphor wheel has a rotating shaft, and said rotating shaft is connected with a motor, wherein when said rotating shaft is driven by said motor, said phosphor wheel is correspondingly rotated with said rotating shaft at said high rotating speed.

3. The phosphor wheel heat-dissipating module according to claim 1, wherein said impeller is a centrifugal impeller or an axial-flow impeller.

4. The phosphor wheel heat-dissipating module according to claim 1, wherein said first outlet is located at a lateral side of said impeller.

5. The phosphor wheel heat-dissipating module according to claim 1, wherein said laser beam emitted by said laser projection system is projected on said outer-ring portion of said first surface of said phosphor wheel at a specific region, and said second portion of said airflow blown out through said at least one second outlet is guided to remove heat from said specific region.

* * * * *